(12) United States Patent
Testolin et al.

(10) Patent No.: US 11,503,761 B2
(45) Date of Patent: Nov. 22, 2022

(54) LAWN MOWER

(71) Applicant: Positec Power Tools (Suzhou) Co., Ltd, Suzhou (CN)

(72) Inventors: Federico Testolin, Vincenza (IT); Davide Dalfra, Mantua (IT)

(73) Assignee: POSITEC POWER TOOLS (SUZHOU) CO., LTD, Suzhou (CN)

(*) Notice: Subject to any disclaimer, the term of this patent is extended or adjusted under 35 U.S.C. 154(b) by 710 days.

(21) Appl. No.: 16/521,180

(22) Filed: Jul. 24, 2019

(65) Prior Publication Data

US 2019/0343040 A1 Nov. 14, 2019

Related U.S. Application Data

(63) Continuation of application No. PCT/CN2018/074177, filed on Jan. 25, 2018.

(30) Foreign Application Priority Data

Jan. 25, 2017 (CN) .......................... 201710056748.7

(51) Int. Cl.
*A01D 34/69* (2006.01)
*A01D 69/02* (2006.01)
*B60L 15/20* (2006.01)
*A01D 101/00* (2006.01)

(52) U.S. Cl.
CPC ............. *A01D 34/69* (2013.01); *A01D 69/02* (2013.01); *B60L 15/20* (2013.01); *A01D 2101/00* (2013.01)

(58) Field of Classification Search
CPC .... A01D 34/69; A01D 69/02; A01D 2101/00; A01D 34/008; A01D 34/828; A01D 34/006; B60L 15/20; Y02T 10/72
See application file for complete search history.

(56) References Cited

U.S. PATENT DOCUMENTS 5,474,315 A 12/1995 Klas et al.
2012/0323420 A1* 12/2012 Koike ................. B60K 7/0007
701/41

FOREIGN PATENT DOCUMENTS

| CN | 101611675 A | 12/2009 |
|----|----|----|
| CN | 201383940 Y | 1/2010 |
| DE | 102015116041 A1 | 3/2016 |
| EP | 2639128 A2 | 9/2013 |
| EP | 2639128 A3 | 5/2018 |
| JP | 2011072202 A | 4/2011 |

(Continued)

*Primary Examiner* — Yuen Wong
(74) *Attorney, Agent, or Firm* — Dentons US LLP

(57) ABSTRACT

A lawn mower including a housing; a walking mechanism, supporting the housing and driving the housing to move, and including at least one drive wheel; at least one motor to drive the at least one drive wheel to rotate; and a control apparatus, preset with a first and a second torque threshold. And when the motor is switched from a stopped state to a running state, the control apparatus controls a difference between a maximum operating output torque of the motor and the first threshold to be within a predetermined range, when the motor is in the running state, the control apparatus controls an operating output torque of the at least one motor to at most increase to the second threshold, the first threshold is less than or equal to a maximum output torque of the motor, and the second threshold is less than the first threshold.

15 Claims, 2 Drawing Sheets

(56) References Cited

FOREIGN PATENT DOCUMENTS

| JP | 2016195544 A | 11/2016 |
|----|--------------|---------|
| WO | 2013/009323 A2 | 1/2013 |
| WO | 2013/009323 A3 | 1/2013 |

* cited by examiner

LAWN MOWER

CROSS-REFERENCE

This application is a continuation of International Application No. PCT/CN2018/074177, filed on Jan. 25, 2018, which claims priority and the benefit of Chinese patent application No. CN 201710056748.7, filed Jan. 25, 2017, the disclosure of which is incorporated herein by reference in its entirety.

BACKGROUND

Technical Field

The present invention relates to the field of power tools, and in particular, to a lawn mower.

Related Art

When a lawn mower is run to trim a lawn, sensors are usually used to perform collision detection on an obstacle to keep the machine safe.

When the machine encounters an obstacle and triggers a collision sensor, a control signal on a drive motor from a motherboard changes to change a running state of a drive wheel. However, within a short time during which a collision occurs but the collision sensor is not triggered, the drive motor keeps running at an original working state. The body of the machine is obstructed but wheels keep moving forward. As a result of a relatively large torque, the wheels skid during a collision to bruise grass.

SUMMARY

Based on this, it is necessary to provide a lawn mower that can prevent a drive wheel from rotating to bruise grass when a collision occurs during working on a lawn.

A lawn mower, comprising: a housing; a walking mechanism, supporting the housing and driving the housing to walk, and comprising a drive wheel; a motor, mounted at the housing, and used to drive the drive wheel to rotate; and a control apparatus, preset with a first torque threshold and a second torque threshold, wherein as the at least one motor is switched from a stopped state to a running state, the control apparatus controls a difference between a maximum actual (e.g., operating) output torque of the at least one motor and the first torque threshold to be within a predetermined range, when the motor is in the running state, the control apparatus controls an actual (e.g., operating) output torque of the at least one motor to at most increase to the second torque threshold, the first torque threshold is less than or equal to a maximum output torque of the motor, and the second torque threshold is less than the first torque threshold.

In an embodiment, comprising at least two motors, respectively driving at least two drive wheels to rotate, wherein the control apparatus independently controls the at least two motors.

In an embodiment, the at least two motors correspond to the same first and/or second torque threshold.

In an embodiment, the at least two motors correspond to different first and/or second torque thresholds.

In an embodiment, when the motor is in the running state, and the actual/operating output torque increases to the second torque threshold, the control apparatus controls a working current of the motor to remain unchanged.

In an embodiment, the control apparatus restricts the actual/operating output torque of the motor by controlling a working current of the motor.

In an embodiment, that the control apparatus controls a difference between a maximum actual/operating output torque of the motor and the first torque threshold to be within a predetermined range specifically comprises: controlling the maximum actual/operating output torque of the motor not to exceed the first torque threshold.

In an embodiment, wherein that the control apparatus controls a difference between a maximum actual/operating output torque of the motor and the first torque threshold to be within a predetermined range specifically comprises: controlling the maximum actual/operating output torque of the motor to exceed the first torque threshold by a value within the predetermined range for duration within a predetermined time, and then controlling the maximum actual/operating output torque of the motor not to exceed the first torque threshold.

In an embodiment, when the maximum actual/operating output torque of the motor reaches the first torque threshold, the control apparatus controls a working current of the motor to remain unchanged.

In an embodiment, the lawn mower is a self-walking lawn mower.

In an embodiment, the lawn mower further comprises a cutting mechanism, and the control apparatus is electrically connected to the cutting mechanism to control the cutting mechanism to perform cutting work.

In an embodiment, the second torque threshold is adjustable.

In an embodiment, the control module adjusts the second torque threshold according to a change in a working current of a cutting mechanism of the lawn mower.

In an embodiment, when the working current of the cutting mechanism increases, the control module increases the second torque threshold, and when the working current of the cutting mechanism decreases, the control module decreases the second torque threshold.

In an embodiment, the control module compares the working current of the cutting mechanism with a preset value, when the working current of the cutting mechanism is greater than the preset value, the control module increases the second torque threshold, and when the working current of the cutting mechanism is not greater than the preset value, the second torque threshold remains unchanged.

DETAILED DESCRIPTION

To make the foregoing objectives, features, and advantages of the present invention more comprehensible, specific implementations of the present invention are described below in detail with reference to the accompanying drawings. Many specific details are described below for better understanding of the present invention. However, the present invention can be implemented in many manners other than those described herein. A person skilled in the art may make similar improvements without departing from the essence of the present invention. Therefore, the present invention is not limited by the specific embodiments disclosed below.

It should be noted that when an element is "fixed" on another element, the element may be directly fixed on the other element or an intervening element may be present. When an element is "connected" to another element, the element may be directly connected to the other element or an intervening element may be present.

Unless otherwise defined, all technical terms and scientific terms used herein have the same meaning as commonly understood by a person skilled in the art to which the present utility model belongs. The terms used herein of the present utility model are merely used to describe specific embodiments but are not used to limit the present utility model. The term "and/or" used in this specification includes any or all combinations of one or more listed items.

Implementations of a lawn mower are described below with reference to the accompanying drawings.

A lawn mower in an embodiment of the present invention walks on a lawn to perform grass cutting work. In this embodiment, the lawn mower is a self-walking lawn mower, and a working region is a lawn. The lawn mower walks and works in the working region. A parking station is disposed in the working region. A charging module is disposed in the parking station. When electrical power stored in an energy storage module in the lawn mower is insufficient, the lawn mower returns to the parking station to perform charging by using the charging module.

Figure 1:
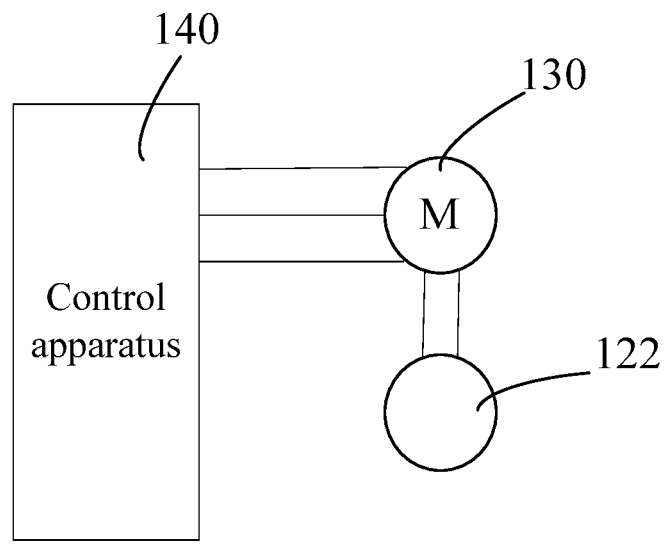
FIG. 1 is a structural block diagram of a lawn mower according to an embodiment.
Figure 2:
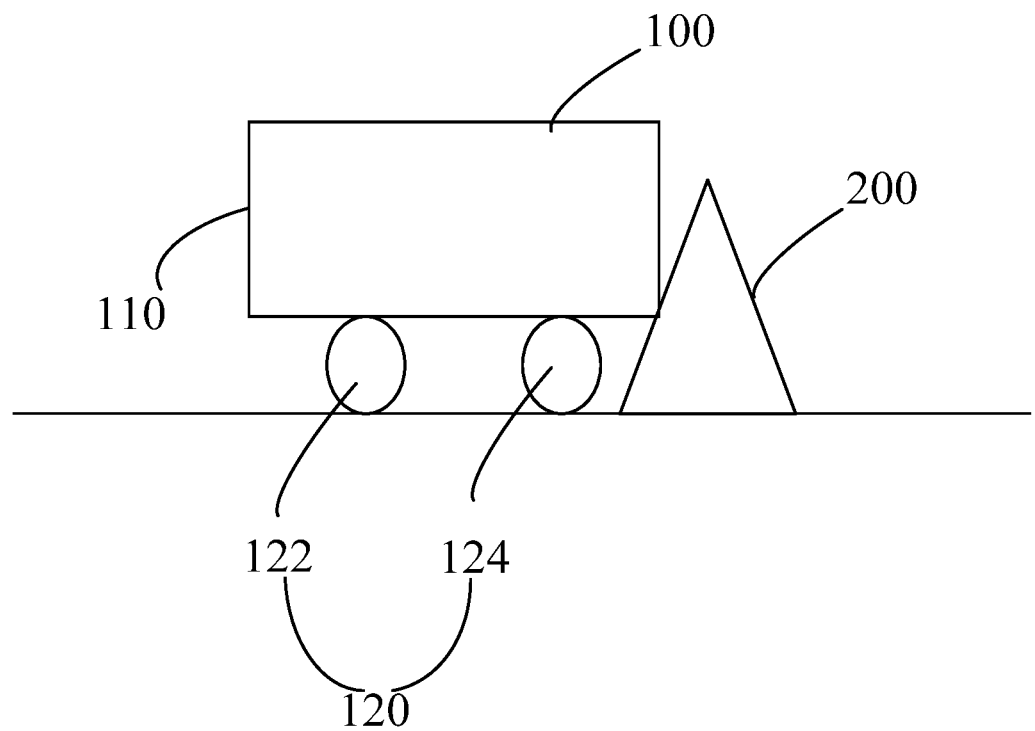
FIG. 2 is a schematic diagram of a lawn mower when a collision occurs according to another embodiment.

Referring to FIG. 1 and FIG. 2, a lawn mower 100 includes a housing 110, a walking mechanism 120, a motor 130, a control apparatus 140, and a cutting mechanism (not shown). The housing 110 is a mounting carrier for other components. The control apparatus 140 is electrically connected to the cutting mechanism to control the cutting mechanism to perform cutting work, so that the lawn mower can perform cutting work when walking in a working region.

The walking mechanism 120 is used to support the housing 110 and drive the housing 110 to walk, and has several walking wheels. The walking wheels include a drive wheel 122 and a driven wheel 124. The drive wheel 122 is located at the rear of the housing 110, and the driven wheel 124 is located at the front of the housing 110. The housing 110 has a particular width. A pair of drive wheels 122 are usually disposed on two sides of a central axis of the housing 110. A pair of driven wheels 124 may be disposed respectively on two sides of the central axis of the housing 110. Alternatively, one drive wheel and one driven wheel may be located on the central axis of the housing 110 and are mounted below the housing 110. Certainly, all walking wheels may be drive wheels.

The motor 130 is mounted at the housing 110 and is used to drive the walking mechanism 120 to walk. A drive shaft of the motor 130 is directly connected to the drive wheel 122 or uses a transmission mechanism to enable the drive wheel 122 to rotate, so as to enable the housing 110 to move forward. In addition, the motor 130 may be further used to drive the cutting mechanism of the lawn mower. Certainly, a dedicated cutting motor may be used to drive the cutting mechanism to work.

The control apparatus 140 is mounted at the housing 110. Referring to FIG. 1, the control apparatus 140 is electrically connected to the motor 130. The control apparatus 140 is configured to restrict a maximum actual/operating output torque of the motor 130. The control apparatus 140 may restrict the maximum actual/operating output torque of the motor 130 by restricting a maximum working current of the motor 130.

As the lawn mower 100 works, the motor 130 is started to switch the motor 130 from a stopped state to a running state. The motor 130 then transfers power to the drive wheel 122 to drive the lawn mower 100 to walk in the working region and normally work, that is, perform cutting work.

Figure 3:
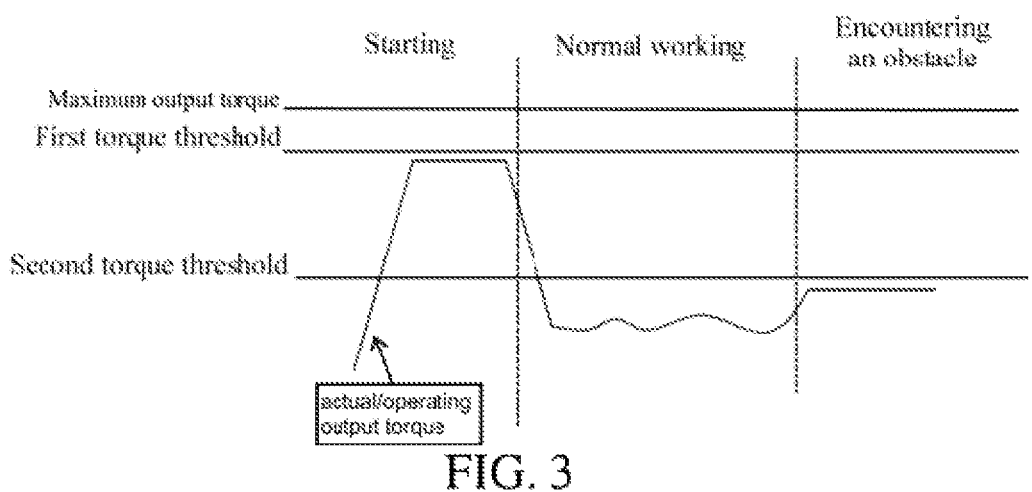
FIG. 3 is a diagram showing a principle of keeping a lawn mower from bruising grass when a collision occurs according to another embodiment.

Referring to FIG. 3, in an embodiment, after the motor 130 is started, the control apparatus 140 controls a difference between the maximum actual/operating output torque of the motor 130 and a first torque threshold to be within a predetermined range. The first torque threshold is a torque threshold that is less than or equal to a maximum output torque of the motor 130, and the purpose is to provide start protection at the start of the motor 130, so as to prevent the motor 130 from damage and extend the service life of the motor 130. The first torque threshold may be preset by a manufacturer, or a user is allowed to preset the first torque threshold according to a working condition before use.

That the control apparatus 140 controls a difference between the maximum actual/operating output torque of the motor 130 and a first torque threshold to be within a predetermined range may be: controlling the maximum actual/operating output torque at the start of the motor 130 not to exceed the first torque threshold. That is, a start torque of the motor 130 is less than or equal to the first torque threshold.

The control apparatus 140 is preset with the first torque threshold. For example, a circuit design is used to achieve that the maximum actual/operating output torque at the start of the motor 130 can only reach the first torque threshold.

In an embodiment, when an actual/operating output torque at the start of the motor 130 is controlled to reach the first torque threshold, the control apparatus 140 controls a working current of the motor to remain unchanged. Certainly, the control apparatus may cut off the working current of the motor 130 to implement overload protection.

That the control apparatus 140 controls a difference between the maximum actual/operating output torque of the motor 130 and a first torque threshold to be within a predetermined range may be alternatively: controlling the maximum actual/operating output torque of the motor 130 to exceed the first torque threshold by a value within the predetermined range for duration within a predetermined time, and then controlling the maximum actual/operating output torque of the motor not to exceed the first torque threshold. In other words, the maximum actual/operating output torque at the start of the motor 130 is allowed to be greater than the first torque threshold within a short time.

In an embodiment, when the actual/operating output torque at the start of the motor 130 exceeds the first torque threshold for the duration exceeding the predetermined time, the control apparatus 140 controls a working current of the motor to remain unchanged. Certainly, the control apparatus may alternatively cut off the working current of the motor 130 to implement overload protection.

Referring to FIG. 3, as the lawn mower 100 works normally, the actual/operating output torque of the motor 130 decreases to be less than the first torque threshold. The drive wheel 122 overcomes the resistance of grass on a lawn to drive the lawn mower 100 to move forward. Referring to FIG. 2, when encountering an obstacle 200, the lawn mower 100 is obstructed and stops moving forward. In this case, within a short time during which a collision occurs but a collision sensor is not triggered, the lawn mower 100 does not execute an action instruction of reversing or steering. Because the resistance increases, the actual/operating output torque of the motor 130 increases, and a torque acting on the drive wheel 122 increases.

To prevent the actual/operating output torque of the motor 130 from increasing to make the drive wheel 122 rotate to bruise grass, referring to FIG. 3, in an embodiment, the control apparatus 140 is further configured with a second torque threshold. The second torque threshold is less than the first torque threshold but is greater than the actual/operating output torque of the lawn mower 100 during normal working. The control apparatus 140 is configured as follows: When the motor 130 is in the running state and the actual/operating output torque increases, the control apparatus 140 controls the actual/operating output torque of the motor 130 not to exceed the second torque threshold, so as to prevent the drive wheel 122 from rotating to bruise grass. In other words, the actual/operating output torque of the motor 130 is controlled from increasing to exceed the second torque threshold.

A setting principle of the second torque threshold is to ensure that the drive wheel 122 can overcome the resistance in grass during normal working and ensure that the drive wheel 122 cannot overcome the resistance caused by an obstacle when encountering the obstacle. Similarly, the second torque threshold may be preset by a manufacturer, or a user is allowed to set the first torque threshold according to a working condition.

The actual/operating output torque of the motor 130 keeps increasing when the lawn mower 100 encounters an obstacle. In an embodiment, when the actual/operating output torque of the motor 130 increases to the second torque threshold, the control apparatus 140 cuts off the working current of the motor 130 to enable the motor 130 to stop, so as to cut off a torque output of the drive wheel 122. Naturally, the drive wheel 122 is not driven to rotate, thereby preventing grass bruising.

In another embodiment, when the actual/operating output torque of the motor 130 increases to the second torque threshold, instead of cutting off the working current of the motor 130, the control apparatus 140 may control the working current of the motor 130 to remain unchanged. In this way, the actual/operating output torque of the motor 130 at most can reach the second torque threshold. As discussed above, the second torque threshold is set to ensure that the drive wheel 122 cannot overcome the resistance caused by an obstacle when encountering the obstacle. In other words, in this case, the actual/operating output torque of the motor 130 is right at a critical point and does not make the drive wheel 122 rotate, thereby preventing grass bruising.

Referring to FIG. 3 together with FIG. 2, when the lawn mower 100 encounters the obstacle 200 during walking, the lawn mower 100 is obstructed and as a result the actual/operating output torque of the motor 130 keeps increasing. In this case, because the control apparatus 140 is further preset with the second torque threshold, the actual/operating output torque of the motor 130 at most can increase to the second torque threshold. In this way, the drive wheel 122 is prevented from overcoming the resistance to rotate, so that grass bruising is prevented.

There are different working conditions such as thick grass working conditions and thin grass working conditions. In some thick grass working conditions, the resistance that the lawn mower 100 encounters during normal walking may be close to that when the lawn mower 100 encounters an obstacle. Therefore, to avoid a misjudgment and ensure that the lawn mower 100 can still normally cut grass in a thick grass working condition, in an embodiment, the second torque threshold is adjustable to adapt to working conditions of different lawns. For example, the control apparatus 140 may adjust the second torque threshold according to a change in a working current of a cutting mechanism of the lawn mower 100 to adapt to different requirements of the thick grass working conditions or thin grass working conditions.

In a working scenario, as the lawn mower 100 walks from a thin grass region to a thick grass region, because the cutting resistance increases, the control apparatus 140 increases the second torque threshold to avoid a case in which the lawn mower 100 cannot move forward because the actual/operating output torque of the motor 130 is insufficient to overcome the resistance of thick grass. In this way, normal cutting work can be ensured.

In a working scenario, as the lawn mower 100 walks from a thick grass region to a thin grass region, the cutting resistance decreases, the working current of the cutting mechanism decreases, and the control apparatus 140 decreases the second torque threshold. In this way, when the obstacle 200 is encountered, the actual/operating output torque of the motor 130 does not increase to overcome the resistance of the obstacle 200 to enable the drive wheel 122 to rotate, thereby preventing grass bruising.

In an embodiment, the control apparatus 140 compares the working current of the cutting mechanism with a preset value. When the working current of the cutting mechanism is greater than the preset value, the control apparatus 140 increases the second torque threshold. When the working current of the cutting mechanism is not greater than the preset value, the second torque threshold remains unchanged. In this way, if the lawn mower 100 is placed in a thick grass region in the beginning, the control apparatus 140 first increases the second torque threshold and then further adjusts the second torque threshold according to the change in the working current of the cutting mechanism. If the lawn mower 100 is placed in a thin grass region in the beginning, the control apparatus 140 temporarily does not increase the second torque threshold and adjusts only the second torque threshold according to the change in the working current of the cutting mechanism, so as to adapt to a working condition change from a thin grass region to a thick grass region. In the foregoing embodiment, when the lawn mower 100 encounters the obstacle 200 during walking, the actual/operating output torque increases but does not exceed the second torque threshold. That is, a maximum working current is preset, so that when the actual/operating output torque increases to the second torque threshold, the control apparatus 140 controls the working current of the motor 130 to remain unchanged, and the actual/operating output torque is in a balanced state, that is, is equal to the second torque threshold but does not make the drive wheel rotate, thereby preventing grass bruising, or the working current of the motor 130 is cut off to prevent grass bruising.

Figure 4:
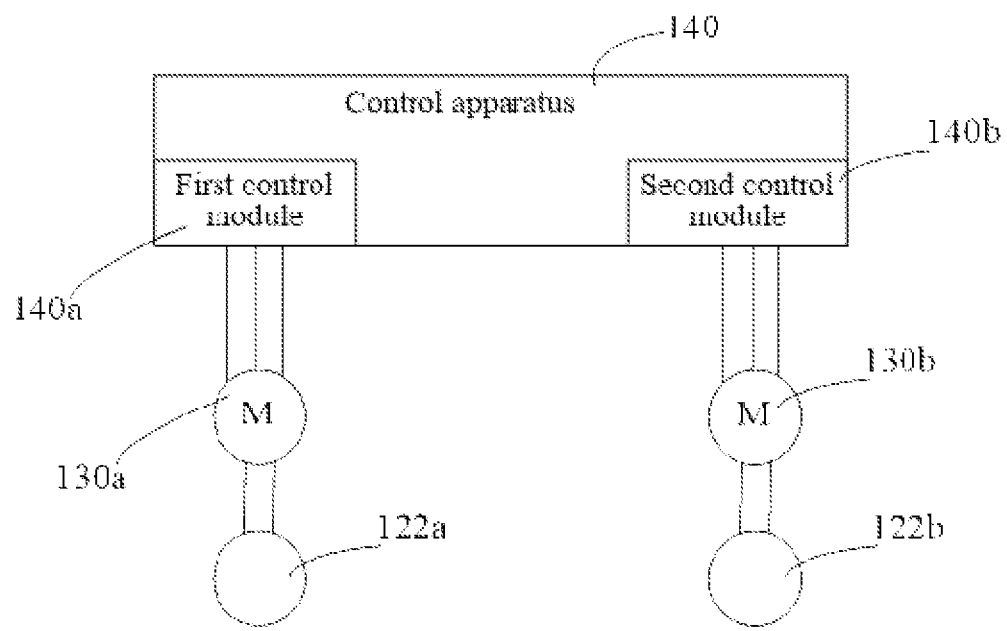
FIG. 4 is a structural block diagram of a lawn mower according to another embodiment.

In an embodiment, as shown in FIG. 4, the drive wheel 122 includes a left drive wheel 122a and a right drive wheel 122b. Correspondingly, the motor 130 includes a first drive motor 130a and a second drive motor 130b. The first drive motor 130a drives the left drive wheel 122a, and the second drive motor 130b drives the right drive wheel 122b. The control apparatus 140 includes a first control module 140a and a second control module 140b. The first control module 140a controls the first drive motor 130a, and the second control module 140b controls the second drive motor 130b, so that each drive motor can separately drive one drive wheel. In this embodiment, a first torque threshold a1 and a second torque threshold a2 that correspond to the first drive motor 130a are preset in the first control module 140a, and a first torque threshold b1 and a second torque threshold b2 that correspond to the second drive motor 130b are preset in the second control module 140b. may be understood that to satisfy different scenario requirements, a1 and b1 may be set to be the same or may be set to be different. Similarly, a2 and b2 may be set to be the same or may be set to be different.

In an embodiment, the lawn mower 100 includes a cutting motor driving the cutting mechanism to work. The cutting motor is controlled by the control apparatus 140. The control apparatus 140 is preset with a preset torque threshold corresponding to the cutting motor.

In an embodiment, the control apparatus 140 is preset with a third torque threshold corresponding to a start state of the cutting motor, so that the maximum actual/operating output torque of the cutting motor at the start can only reach the third torque threshold. The control apparatus 140 is further configured with a fourth torque threshold corresponding to the running state of the cutting motor. The fourth torque threshold is less than the third torque threshold but is greater than the actual/operating output torque of the cutting motor during normal working. Specifically, when the cutting motor is in the running state and the actual/operating output torque increases, the control apparatus 140 controls the actual/operating output torque of the cutting motor not to exceed the fourth torque threshold.

Generally, the fourth torque threshold is set to ensure that the cutting motor can overcome the resistance in grass during normal working and ensure that the cutting mechanism can perform a corresponding action when the cutting mechanism encounters an obstacle or is in a jammed state to avoid abnormal working. Similarly, the third torque threshold and the fourth torque threshold may be preset by a manufacturer, or a user is allowed to set the first torque threshold according to a working condition.

In the foregoing embodiments, the lawn mower 100 is mainly described by using a self-walking lawn mower (or referred to as an intelligent lawn mower) as an example. However, the lawn mower 100 may be another type of lawn mower.

For example, the lawn mower 100 may be a walk-behind lawn mower, and a user operates a handle to control a moving direction of the lawn mower and control the lawn mower to move forward, reverse, steer or perform another action. The control apparatus 140 may automatically enable the second torque threshold or provide a control instruction after observation by the user.

For another example, the lawn mower 100 may be a ride-on lawn mower that is similar to the walk-behind lawn mower. A difference lies in that the ride-on lawn mower has a seat for a user to sit on, and the user sits on the lawn mower to perform operations.

The technical features in the foregoing embodiments may be randomly combined. For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementations of the present invention, and their description is specific and detailed, but cannot therefore be understood as a limitation to the patent scope of the present invention. It should be noted that a person of ordinary skill in the art may be further make variations and improvements without departing from the conception of the present invention, and these all fall within the protection scope of the present invention. Therefore, the patent protection scope of the present invention should be subject to the appended claims.

What is claimed is:

1. A lawn mower, comprising:
   a housing;
   a walking mechanism, supporting the housing and driving the housing to move, and comprising at least one drive wheel;
   at least one motor, mounted at the housing, and used to drive the at least one drive wheel to rotate; and
   a control apparatus, mounted in the housing and electrically connected to the at least one motor, is preset with a first torque threshold and a second torque threshold,
   wherein as the at least one motor is switched from a stopped state to a running state, the control apparatus controls a difference between a maximum operating output torque of the at least one motor and the first torque threshold to be within a predetermined range,
   wherein when the at least one motor is in the running state, the control apparatus controls an operating output torque of the at least one motor to, at most, increase to the second torque threshold,
   wherein the first torque threshold is less than or equal to a maximum output torque of the at least one motor, and
   wherein the second torque threshold is less than the first torque threshold.

2. The lawn mower according to claim 1, comprising at least two motors, respectively driving at least two drive wheels to rotate, wherein the control apparatus independently controls the at least two motors.

3. The lawn mower according to claim 2, wherein the at least two motors correspond to the same first and second torque thresholds.

4. The lawn mower according to claim 2, wherein the at least two motors correspond to different first and second torque thresholds.

5. The lawn mower according to claim 1, wherein when the at least one motor is in the running state, and the operating output torque increases to the second torque threshold, the control apparatus controls a working current of the at least one motor to remain unchanged.

6. The lawn mower according to claim 1, wherein the control apparatus restricts the operating output torque of the at least one motor by controlling a working current of the at least one motor.

7. The lawn mower according to claim 1, wherein that the control apparatus controls a difference between a maximum operating output torque of the at least one motor and the first torque threshold to be within a predetermined range specifically comprises:
   controlling the maximum operating output torque of the at least one motor not to exceed the first torque threshold.

8. The lawn mower according to claim 7, wherein when the maximum operating output torque of the motor reaches the first torque threshold, the control apparatus controls a working current of the at least one motor to remain unchanged.

9. The lawn mower according to claim 1, wherein that the control apparatus controls a difference between a maximum operating output torque of the at least one motor and the first torque threshold to be within a predetermined range specifically comprises:
   controlling the maximum operating output torque of the at least one motor to exceed the first torque threshold by a value within the predetermined range for duration within a predetermined time, and then controlling the maximum operating output torque of the at least one motor not to exceed the first torque threshold.

10. The lawn mower according to claim 1, wherein the lawn mower is a self-walking lawn mower.

11. The lawn mower according to claim 1, wherein the lawn mower further comprises a cutting mechanism, and the control apparatus is electrically connected to the cutting mechanism to control the cutting mechanism to perform cutting work.

12. The lawn mower according to claim 1, wherein the second torque threshold is adjustable.

13. The lawn mower according to claim 12, wherein the control apparatus adjusts the second torque threshold according to a change in a working current of a cutting mechanism of the lawn mower.

14. The lawn mower according to claim 13, wherein when the working current of the cutting mechanism increases, the control apparatus increases the second torque threshold, and when the working current of the cutting mechanism decreases, the control apparatus decreases the second torque threshold.

15. The lawn mower according to claim 13, wherein the control apparatus compares the working current of the cutting mechanism with a preset value, when the working current of the cutting mechanism is greater than the preset value, the control apparatus increases the second torque threshold, and when the working current of the cutting mechanism is not greater than the preset value, the second torque threshold remains unchanged.

* * * * *